United States Patent
Nachum

(10) Patent No.: US 7,974,610 B2
(45) Date of Patent: Jul. 5, 2011

(54) PERSISTENCE OF INTERRUPTED CALLS

(75) Inventor: Assaf Nachum, Petach-Tikva (IL)

(73) Assignee: Comverse Ltd., Tel Aviv (IL)

( * ) Notice: Subject to any disclaimer, the term of this patent is extended or adjusted under 35 U.S.C. 154(b) by 600 days.

(21) Appl. No.: 11/600,733

(22) Filed: Nov. 17, 2006

(65) Prior Publication Data

US 2008/0118047 A1    May 22, 2008

(51) Int. Cl.
*H04M 3/42* (2006.01)
*H04W 4/00* (2009.01)
*H04W 24/00* (2009.01)

(52) U.S. Cl. .............. 455/417; 455/422.1; 455/423

(58) Field of Classification Search ......... 455/417, 455/404.1, 422.1, 435.1, 435.2, 423, 432, 455/431, 442, 412.1, 426.1, 458, 433, 421, 455/436, 413, 445, 414.1, 414.2, 127, 13.1, 455/450, 510; 379/210.01, 201, 209
See application file for complete search history.

(56) References Cited

U.S. PATENT DOCUMENTS

| | | | |
|---|---|---|---|
| 6,175,733 B1 * | 1/2001 | Seekins et al. | 455/434 |
| 6,215,782 B1 * | 4/2001 | Buskens et al. | 370/350 |
| 6,246,872 B1 * | 6/2001 | Lee et al. | 455/414.1 |
| 6,249,681 B1 * | 6/2001 | Virtanen | 455/466 |
| 6,343,216 B1 * | 1/2002 | Kim et al. | 455/450 |
| 6,360,109 B1 | 3/2002 | Thauvin et al. | |
| 6,393,272 B1 | 5/2002 | Cannon et al. | |
| 6,445,918 B1 * | 9/2002 | Hellander | 455/423 |
| 6,445,921 B1 * | 9/2002 | Bell | 455/426.1 |
| 6,456,842 B1 | 9/2002 | Subramanian et al. | |
| 6,493,447 B1 * | 12/2002 | Goss et al. | 379/265.09 |
| 6,633,760 B1 * | 10/2003 | Ham et al. | 455/422.1 |
| 6,782,268 B1 | 8/2004 | Thompson et al. | |
| 6,973,317 B2 | 12/2005 | Dolan | |
| 6,999,572 B1 | 2/2006 | Shaffer et al. | |
| 2002/0090947 A1 * | 7/2002 | Brooks et al. | 455/436 |
| 2005/0048981 A1 * | 3/2005 | Anupam et al. | 455/445 |
| 2005/0070286 A1 * | 3/2005 | Awasthi et al. | 455/436 |
| 2005/0255870 A1 * | 11/2005 | Chang et al. | 455/502 |
| 2007/0054660 A1 * | 3/2007 | Cardina et al. | 455/417 |
| 2007/0274488 A1 * | 11/2007 | Callaghan | 379/201.01 |
| 2007/0275711 A1 * | 11/2007 | Buti et al. | 455/423 |
| 2009/0111458 A1 * | 4/2009 | Fox et al. | 455/422.1 |
| 2009/0129358 A1 * | 5/2009 | Miyashita | 370/342 |

* cited by examiner

*Primary Examiner* — Melody Mehrpour

(74) *Attorney, Agent, or Firm* — Ohlandt, Greeley, Ruggiero & Perle, LLP

(57) ABSTRACT

A system for recovering an unintentionally interrupted call in a telephony network includes an interrupted call data capturer and a re-connector. The interrupted call data capturer is deployable in the telephony network and configured to capture data pertaining to an interruption of the call from the telephony network. The re-connector is associated with the interrupted call data capturer and configured to use the captured data to automatically reconnect at least one unintentionally disconnected participant of the call, thereby recovering the unintentionally interrupted call.

19 Claims, 5 Drawing Sheets

PERSISTENCE OF INTERRUPTED CALLS

BACKGROUND OF THE INVENTION

1. Field of the Invention

The present invention relates to telephony services. More particularly, but not exclusively, the present invention relates to systems and methods for providing persistence of an interrupted call in a telephony network.

2. Description of the Background Art

Wireless communication technology has allowed individuals considerable freedom in how and when they communicate with each other. Analog signal-based cellular telephone technology, which allows people to travel freely while always having access to a telephone, has grown and developed into digital-based systems and hybrid telephone/multifunction devices so that a number of functions are now provided in a single integrated device.

One inconvenience frequently experienced by cellular users today is the interruption of mobile calls as a result of a short network disconnection. Usually, the short network disconnection occurs when a cellular user passes through areas with low coverage of the Cellular Networks. The short network disconnection may also occur on a temporarily coverage blocking, or upon interferences over the transmission lines between the cellular user's mobile unit and a serving cellular antenna (BTS) of the cellular telephony provider.

For example, a cellular user may experience a short network disconnection when entering an elevator in a large office building, while having a cellular call. Elevators often cause a disconnection between a mobile handset and its serving cellular antenna (BTS), due to the low level of the RF (Radio Frequency) Signal received from the mobile unit at the serving cellular antenna (BTS), when the cellular user is in the elevator.

Many attempts have been made to improve the quality of service experienced by a cellular user.

U.S. Pat. No. 6,360,109 issued to Thauvin et al, entitled "Terminal, Automatic Recall Procedure, and Telecommunication System," filed on Apr. 22, 1998, and hereby incorporated by reference in its entirety, discloses a terminal, an automatic recall procedure, and a telecommunication system, which include means for integrating an automatic repeat call function in a terminal of a telecommunication network. The terminal described by Thauvin is provided with a data transfer protocol which operates in a simultaneous bidirectional mode. The automatic repeat call function is realized by a device integrated in a local terminal.

The local terminal is provided with a command to be triggered after an effort to achieve a connection to a distant terminal has failed. The object of the command is to automatically repeat the effort until the connection has been established. However, the repeated effort to achieve a connection is limited by a given number of repeated attempts.

That is to say, the automatic repeat call function has to be installed in each and every mobile terminal of a subscriber of an automatic repeat call service, as described by Thauvin.

U.S. Pat. No. 6,782,268 issued to Thompson et al, entitled "Method and Apparatus for Tracking Call History for Mobile and Wire Line Users Accessing the Network on Different Ports for Subsequent Calls," filed on Jun. 23, 1998, and hereby incorporated by reference in its entirety describes a method and a system for associating call data with particular users instead of line ports. The call data includes the last incoming and outgoing calls associated with a particular number. Consequently, there are allowed services, such as automatic callback, automatic recall, and customer originated trace, to be implemented with dynamic line assignment allowing users to maintain the same level of subscribed services at different locations.

U.S. Pat. No. 6,393,272 issued to Cannon et al, entitled "Wireless Answer and Hold Feature," filed on May 21, 2002, and hereby incorporated by reference in its entirety describes a telephone including an answer and hold feature. Using the answer and hold feature, in response to a user input, the telephone answers an incoming call, issues an outgoing greeting message, and maintains a connection status. Thus, the called party may unobtrusively cause the call to be held in the connected status until a time when the called party can conveniently enter into a conversation.

U.S. Pat. No. 6,999,572 issued to Shaffer et al, entitled "Automated Call Connection System," filed on May 1, 1998, and hereby incorporated by reference in its entirety relates to automatically connecting calls, and more particularly to an improved, automated system and method for connecting multi-media calls. Shaffer describes a call back method where a first user may request a second user to call him back, and the two sides may be automatically connected.

U.S. Pat. No. 6,973,317 issued to Dolan, entitled "Call Completion Based on Movement of Mobile Station," and filed on Dec. 18, 2000, and hereby incorporated by reference in its entirety describes a callback service for completing a call from a calling party to a mobile station of a called party. The Dolan Patent relates to a call previously failed due to no response. After the call fails due to no response, the mobile station of the called party is monitored to determine if the mobile unit is moved to another cover area of the network, and when such movement is determined to occur, a callback is initiated between the calling party and the called party.

U.S. Pat. No. 6,456,842 issued to Subramanian et al, entitled "System and Method for Subscriber-Controlled Call Back on Busy in a Cellular Network," filed on Sep. 13, 1999, and hereby incorporated by reference in its entirety describes a telecommunications system and method for allowing a calling mobile subscriber to activate a call back on busy feature and specify the maximum waiting period after which the call back is no longer attempted. Upon reception of a busy indication at an original Mobile Switching Center/Visitor Location Register (MSC/VLR) serving the calling mobile subscriber, the original MSC/VLR plays an announcement to the calling subscriber to collect the time interval beyond which the network should cease to attempt the call back.

None of the above patents describes a method for overcoming the inconvenience experienced by cellular telephony users when a mobile phone call is interrupted as a result of a short and unintended disconnection. There is thus a widely recognized need for, and it would be highly advantageous to have, a system devoid of the above limitations.

SUMMARY OF THE INVENTION

In one exemplary embodiment, the present invention relates to a system for recovering an unintentionally interrupted call in a telephony network. The system includes an interrupted call data capturer deployable in the telephony network and configured to capture data pertaining to an interruption of the call from the telephony network. The system also includes a re-connector associated with the interrupted call data capturer and configured to use the captured data to automatically reconnect at least one unintentionally disconnected participant of the call, thereby recovering the unintentionally interrupted call.

In another exemplary embodiment, the present invention relates to a method for recovering an unintentionally interrupted call in a telephony network. The method includes capturing data pertaining to an interruption of the call from the telephony network and automatically reconnecting at least one unintentionally disconnected participant of the call, thereby recovering the unintentionally interrupted call.

Other exemplary embodiments and advantages of the invention will be apparent from the following description and the appended claims.

DETAILED DESCRIPTION OF THE PREFERRED EMBODIMENTS

Figure 1:
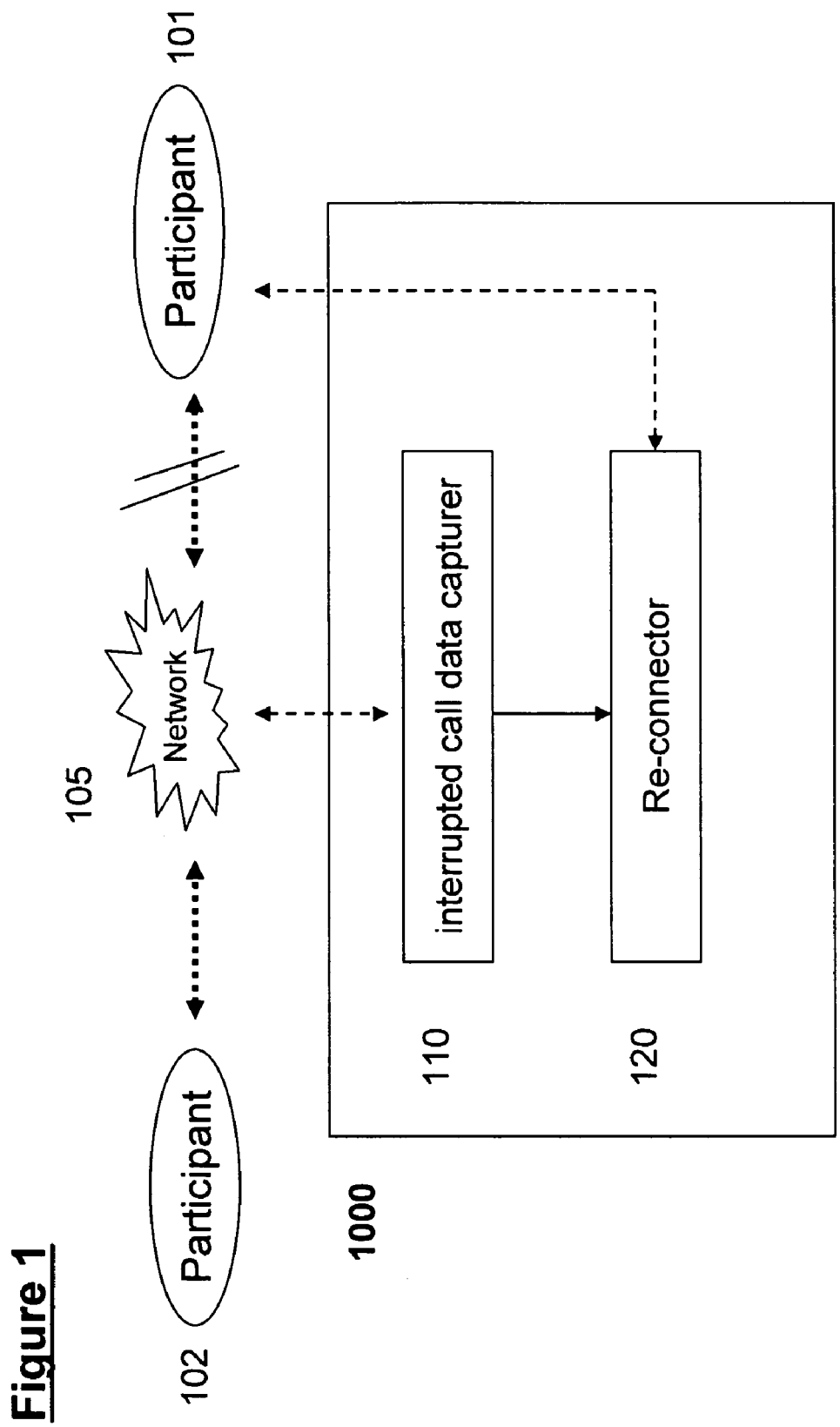
FIG. 1 is a block diagram illustrating a system for recovering an unintentionally interrupted call in a telephony network in accordance with an exemplary embodiment of the present invention.

Embodiments of the present invention relate generally to systems and methods for recovering an unintentionally interrupted call in a telephony network.

In accordance with an exemplary embodiment of the present invention, a phone call unintentionally interrupted as a result of a short network disconnection, or another failure in the network may be automatically recovered. For example, two parties may engage in a telephone call, through a telephony network, such as a cellular telephony network or an Internet Protocol Multimedia Subsystem (IMS) based telephony network. One of the parties may unintentionally disconnect from the network, while the second is not disconnected. Such interruptions unintended by the first party may occur when passing through an area of low network coverage, on temporary coverage blocking, upon interferences over the transmission lines between the cellular user's mobile unit and a serving cellular antenna (BTS) of the cellular telephony provider, etc.

For example, many cellular phone calls are interrupted when one of the call participants enters an elevator in the middle of the cellular call. Elevators very often cause a disconnection between a mobile handset and a Serving Cellular Antenna (BTS), due to low RF (Radio Frequency) signal reception by the Serving Cellular Antenna (BTS) when the participant who uses the mobile handset enters the elevator. Currently, the participant who remains connected is disconnected within a predefined short time, and the phone call is released, say by a Mobile Switching Center (MSC) of a cellular telephony network.

In one exemplary embodiment of the present invention, the first participant, who remains connected, is held on the line. While holding the first participant connected, there are made attempts to reconnect the unintentionally disconnected second participant. When the first participant is successfully reconnected, the two participants are reconnected in the call, thus recovering the telephone call. Consequently, telephony subscribers may enjoy better connectivity to the telephony network, and telephony operators may save income lost as a result of unintentionally interrupted calls. Furthermore, telephony operators may be able to increase their income by offering Value Added Services (VAS), in accordance with another exemplary embodiment of the present invention.

The principles and operation of a system in accordance with exemplary embodiments of the present invention may be better understood with reference to the drawings and accompanying description. Before explaining at least one embodiment of the invention in detail, it is to be understood that the invention is not limited in its application to the details of construction and the arrangement of the components set forth in the following description, or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram illustrating a system for recovering an unintentionally interrupted call in a telephony network, in accordance with an exemplary embodiment. System 1000 includes an interrupted call data capturer 10. The interrupted call data capturer 10 may be deployed in a core of a telephony network 105. The network may be, but is not limited to: a cellular network, an Intelligent Network (IN), an Internet Protocol Multimedia Subsystem (IMS) based network, etc.

Continuing with the embodiment shown in FIG. 1, the interrupted call data capturer 110 captures data pertaining to the interruption of the call from the telephony network 105. Optionally, the interrupted call data capturer 10 uses a predefined capturing policy for capturing the data pertaining to the interruption of the call from the telephony network 105. For example, the predefined capturing policy may define rules for recognizing an unintentionally interrupted call, rules indicating which unintentionally interrupted calls are relevant (e.g., only calls initiated by a caller who subscribes to an interrupted call recovery service are captured), etc.

In the particular embodiment shown in FIG. 1, system 1000 also includes a re-connector 120, associated with the interrupted call data capturer 10. The re-connector 120 automatically reconnects one or more participants 101 unintentionally disconnected from the call due to interference or another network malfunction, as described in further detail hereinabove. Optionally, the re-connector 120 simultaneously keeps remaining participants 102 of the call connected while reconnecting the unintentionally disconnected participant(s) 101. Once the unintentionally disconnected participants 101 are successfully reconnected, the remaining participants 102 are reconnected in the call and the unintentionally interrupted call is recovered.

In another exemplary embodiment, the re-connector 120 may also temporarily divert the remaining participant(s) 102 to a media server. The media server may be used to play the remaining participant(s) 102 a relevant message while the re-connector 120 attempts to reconnect the participants unintentionally disconnected. For example, the media server may play the remaining participant(s) 102 a message informing them that a temporary disconnection has occurred, and asking them to hold the line while the call is reconnected. Upon successfully reconnecting the unintentionally disconnected participant(s) 101, the remaining participant(s) 102 is (are) diverted back, and all participants 101, 102 of the call are reconnected in the call.

In another exemplary embodiment, the re-connector 120 may disconnect the remaining participant(s) 102 upon failing to reconnect the unintentionally disconnected participant(s) 101 within a predefined period of time, thereby releasing the call. The predefined period of time may be defined by an operator (or an administrator) of the system.

In another exemplary embodiment, the period of time may be defined in accordance with instructions provided by a subscriber of the telephony network who subscribes to a call recovery service. For example, a subscriber of the telephony network could subscribe to a call recovery Value Added Service (VAS). The subscriber defines a subscriber specific time-out of two minutes. Consequently, when a call made by the subscriber is unintentionally interrupted, an attempt to recover the call is limited to the time-out period. If the call is not reconnected within two minutes, all parties of the call are disconnected and the call is released.

Figure 2:
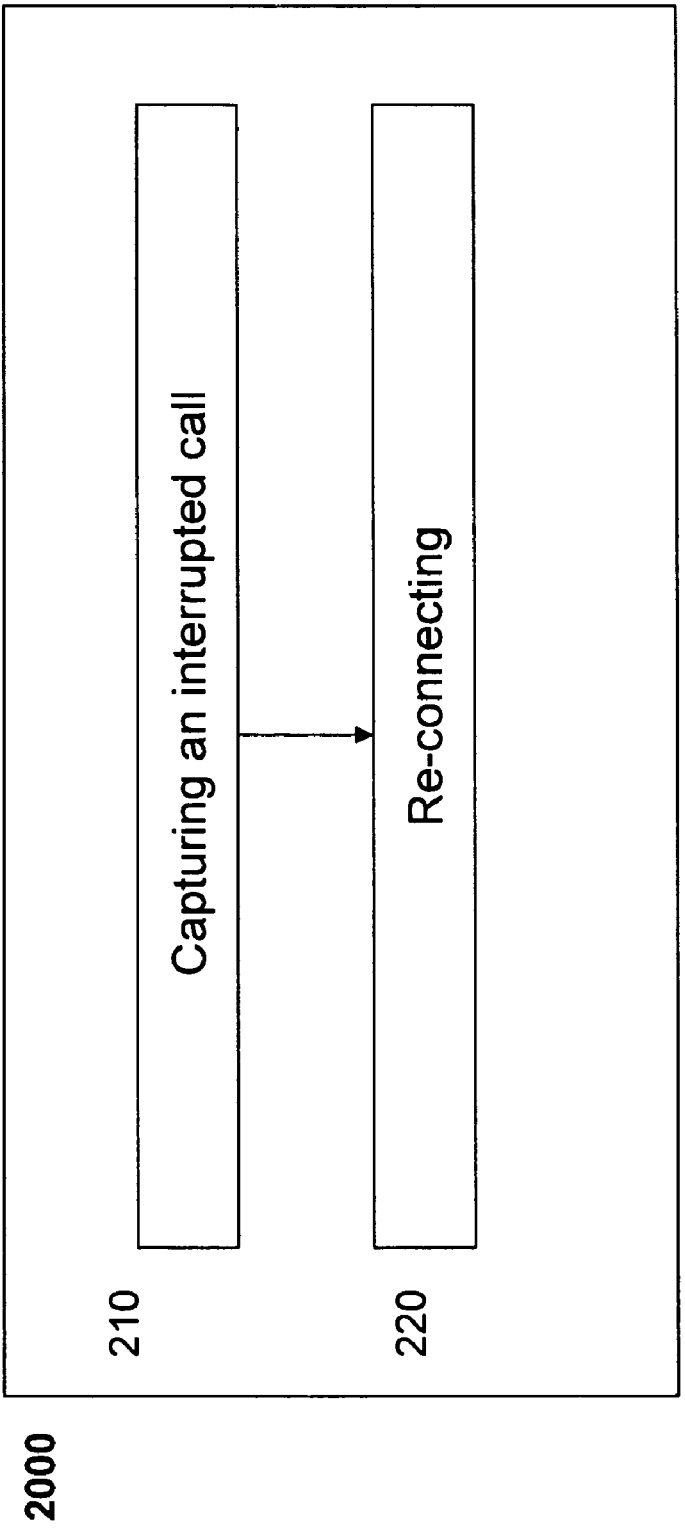
FIG. 2 is flowchart illustrating a method for recovering an unintentionally interrupted call in a telephony network in accordance with an exemplary embodiment of the present invention.

Reference is now made to FIG. 2, which is a flowchart illustrating a method for recovering an unintentionally interrupted call in a telephony network in accordance with an exemplary embodiment of the present invention. In accordance with method 2000, data pertaining to the interruption of the unintentionally interrupted call in the telephony network, is captured 210. In one embodiment, capturing 210 the interrupted call may be accomplished with a system 1000, as described above with reference to FIG. 1.

In one embodiment, the capturing of the data pertaining to the interruption of the call from the telephony network is carried out according to a predefined capturing policy. In one embodiment, the capturing policy may be defined or modified by an operator or a system administrator of a system 1000, as described above with reference to FIG. 1. The predefined capturing policy may include, but is not limited to rules for recognizing an unintentionally interrupted call, rules indicating which unintentionally interrupted calls are relevant, etc, as described hereinabove.

Continuing with the embodiment shown in FIG. 2, upon the capturing 210 of the data pertaining to the unintentionally interrupted call, one or more unintentionally disconnected participant(s) of the call are automatically reconnected 220, thereby recovering the unintentionally interrupted call. In one embodiment, one or more remaining participant(s) of the call are kept connected while reconnecting the unintentionally disconnected participant(s). When the unintentionally disconnected participant(s) are successfully reconnected, all participants of the call are connected, for recovering the unintentionally interrupted call.

In one embodiment, the remaining participant(s) of the call is (are) temporarily diverted to a media server. The media server may be used to play the remaining participant(s) an announcement, such as a message asking them to hold the line while the call is being reconnected. Upon successfully reconnecting the unintentionally disconnected participant(s), the remaining participant(s) is (are) diverted back, and all participants of the call are reconnected in the call. In one embodiment, when attempts to reconnect the unintentionally disconnected participant within a predefined period of time fail, the remaining participant(s) are disconnected, thereby releasing the call. The predefined period of time may be defined by an operator (or an administrator) of the system. In another embodiment, the period of time is defined by a subscriber of the telephony network who subscribes to a call recovery service, as described in further detail above.

Figure 3:
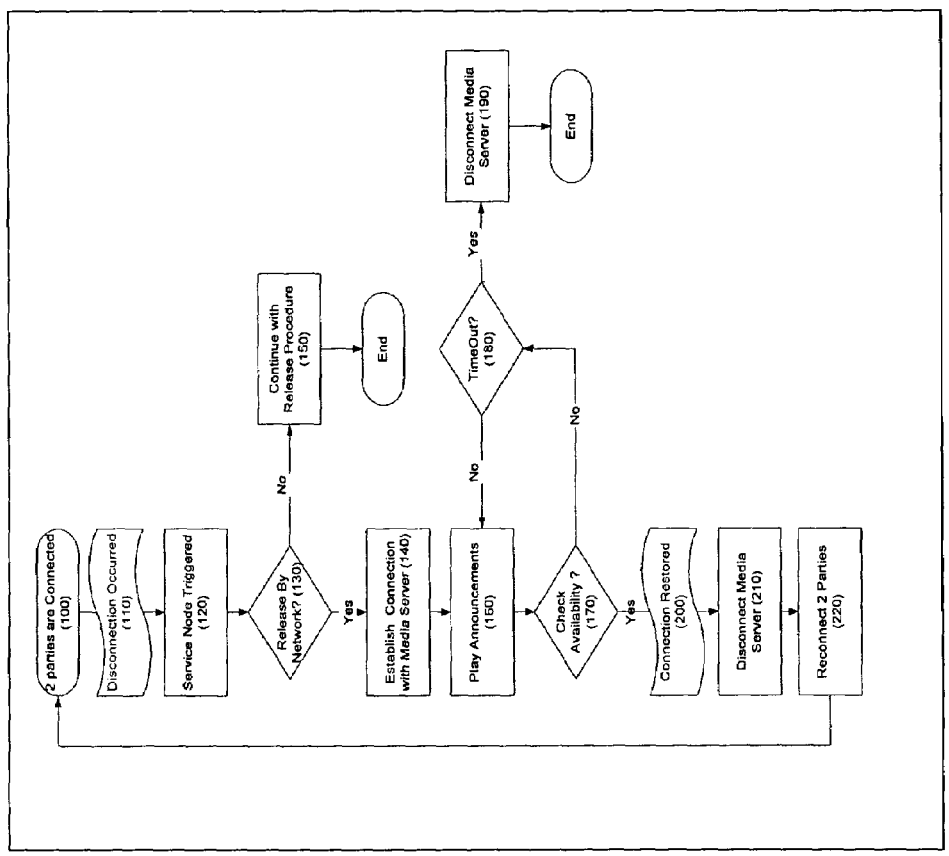
FIG. 3 is a flowchart illustrating a method for recovering an unintentionally interrupted call between two parties in accordance with an exemplary embodiment of the present invention.

Reference is now made to FIG. 3, which is a flowchart illustrating a method for recovering an unintentionally interrupted call between two parties, in accordance with an exemplary embodiment of the present invention. The method shown in FIG. 3 is for recovering an unintentionally interrupted call between two parties. The method aims at improving the network connectivity enjoyed by a specific group of mobile telephony subscribers. The method may be implemented using a core application, such as a Service Control Point (SCP) component of an Intelligent Network (IN). A Service Control Point (SCP) is a standard component of an IN (Intelligent Networks) telephone system which is used to control the service. The SCP may communicate with an "Intelligent Peripheral" (IP) or "Special Resource Function" (SRF) to play voice messages, or prompt for information to the user, such as prepaid long distance using account codes. The core application resides in the core of the network. The core application may register to appropriate service triggers, per a cellular network's specific Mobile Subscriber (MS), as known in the art.

Continuing with the method shown in FIG. 3, when there occurs 120 a disconnection of one of the parties connected 110 in a phone call, a service node is triggered 120, which causes the core application to capture data pertaining to the call release event. The core application may also identify the cause of the call release (e.g. "Network Malfunction" for interference in transmission lines).

In step 130, the core application determines whether the release was accidentally caused by the network. If the release was intentional, the release procedure is continued 150. If the core application determines that the disconnection is because of the network and not because one of the parties has intentionally terminated the call, the application holds the line of the party that is still connected. The application may temporarily route 140 the party still connected to a media server (e.g. Intelligent Peripheral—IP, in an Intelligent Network—IN). The media server plays 160 the party some announcements (e.g. "A temporary disconnection has occurred. Please hold the line until the call is restored").

With the still connected party connected to the media server, the core application tries to reconnect the disconnected party. The application verifies 170 that the disconnected party is successfully reconnected. The verification of the reconnection may be carried out in one of several possible ways including but not limited to:

Using call establishment retries.

Polling to network serving entities or a home network database (e.g. a Home Location Register—HLR, a Visitor Home Location Register—VLR), using Mobile Application Protocol—MAP.

Registering to a specific Mobility event in a Network Serving Entity in a Home Network Database, etc.

Upon successful reconnection 200 of the disconnected party, the application re-routes 210 the party who remains connected from the media server back to the reconnected party. Consequently, the two parties are joined together again 220, thus recovering the call between the two parties.

The attempt to recover the call between the parties may be limited by a predefined time-out. If the application fails to reconnect the disconnected party within the predefined time-out 180, the application announces the failure to the connected party via the media server, and disconnects 190 the connected party. Consequently, the interrupted call is released. In one embodiment, the time-out is a subscriber specific period of time. The subscriber may define the time-out for calls that (s)he participates in, as described in further detail hereinabove.

Figure 4:
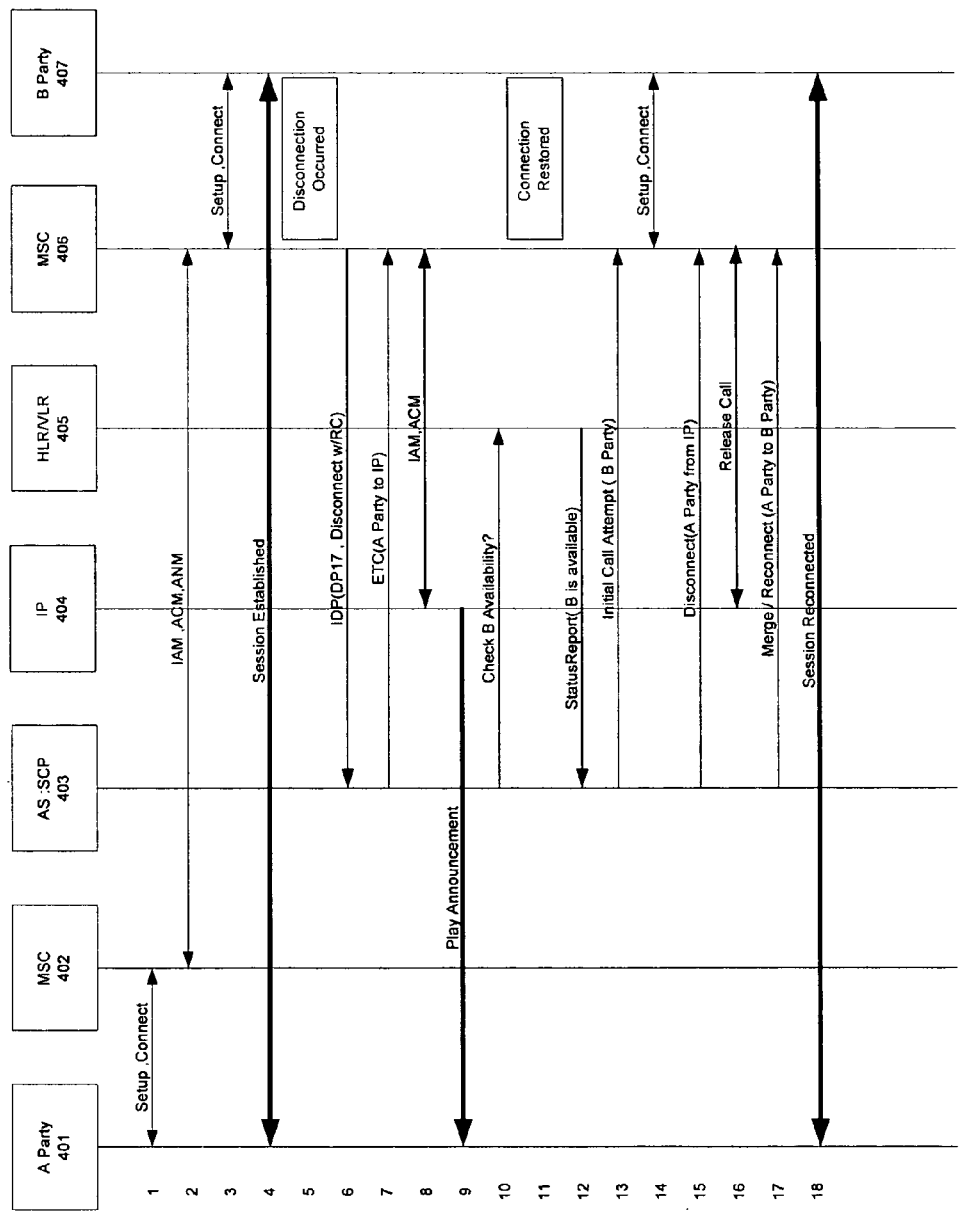
FIG. 4 is a flowchart illustrating a method for recovering an unintentionally interrupted call in a cellular telephony having an Intelligent Network (IN) architecture in accordance with an exemplary embodiment of the present invention.

Reference is now made to FIG. 4, which is a flowchart illustrating a method for recovering an unintentionally interrupted call in a cellular telephony having Intelligent Network (IN) architecture in accordance with an exemplary embodiment of the present invention. The method shown in FIG. 4 may be implemented in a cellular telephony having Intelligent Network (IN) architecture.

When a first party establishes a call to a second party, and some interference occurs during the call in the cellular line connecting the second party, the network may disconnect the second party with a network problem indication. The first party may then routed to an Intelligent Peripheral (IP) of the Intelligent Network (IN), as known in the art. The Intelligent Peripheral (IP) plays the first party some announcements regarding the temporary disconnection of the call. When the second party is available again (i.e. when the interference or other network problem disappears), the second party is automatically reconnected, and the first party is automatically reconnected to the second party, thus recovering the interrupted call.

In FIG. 4, numbers 1-18 refer to time or process cycles. A first party 401 may initiate 1 an Integrated Services Digital Network (ISDN) call procedure to a serving Mobile Services Switching Center (MSC) 402, for calling a second party 407. The MSCs serving the two parties 401,407 execute 2 SS7 Call procedures. SS7 is a sophisticated telecommunications protocol that provides out-of-band signaling and a data interface between telephone company switches In the method shown in FIG. 4, the MSC serving the second party 407 connects the second party 407 by executing 3 an Integrated Services Digital Network (ISDN) call procedure (over the Radio channels), thus establishing 4 a call session between the two parties 401,407. When interferences occur 5 between the second party 407 and the MSC 406 serving the second party 407, the second party 407 is disconnected. An Intelligent Network (IN) Initial Detection Point is sent 6 to the Service Control Point (SCP) component 403 due to the MSC 406 disconnection with a specific Release Cause (RC) indicating a Network Out Of Order (RC#38) or Destination Out Of Order (RC#27), as known in the art.

Next, the SCP 403 instructs 7 the Intelligent Peripheral (IP) 404 of the Intelligent Network (IN) to establish a temporarily connection with the first party 401. The temporary connection is used to hold the first party 401 connected while an attempt is made to reconnect the second party 407. The Intelligent Peripheral (IP) 404 establishes 8 the temporary connection using an SS7 message sent to the first party 401, and SS7 Communication is established between the IP 404 and the first party 401.

The Intelligent Peripheral (IP) 404 plays 9 the first party 401 an announcement which informs the first party 401 about the temporary interruption of the call, and asks the first party 401 hold the line until the second party 407 is reconnected. During the interaction between the IP 404 and the first party 401, an attempt is made to reconnect the second party 406, thereby to recover the interrupted call.

The SCP 403 investigates (repeatedly queries or waits to be notified as described above) 10 the Home Location Register (HLR) 405 for the availability of the second party 407. The SCP keeps querying 10 the Home Location Register (HLR) 405 for the availability of the second party 407, until the HLR 405 notifies 12 the SCP 403 that the second party 407 is available 11 again (i.e. that the interferences between the second party 407 and its serving MSC 406 are ended).

Then, the SCP 403 instructs 13 the Mobile Services Switching Center (MSC) 407 serving the second party to reconnect the second party to the call. The MSC 407 executes 14 a ISDN Call Procedure towards second party 407, and instructs 15 the IP 404 to disconnect from the first party 401. Consequently, the Intelligent Peripheral (IP) 404 disconnects 16 from the first party 401. Finally, the SCP 403 instructs 17 MSC 406 to reconnect the two parties (merge the two Call legs), and the call is successfully recovered 18.

Figure 5:
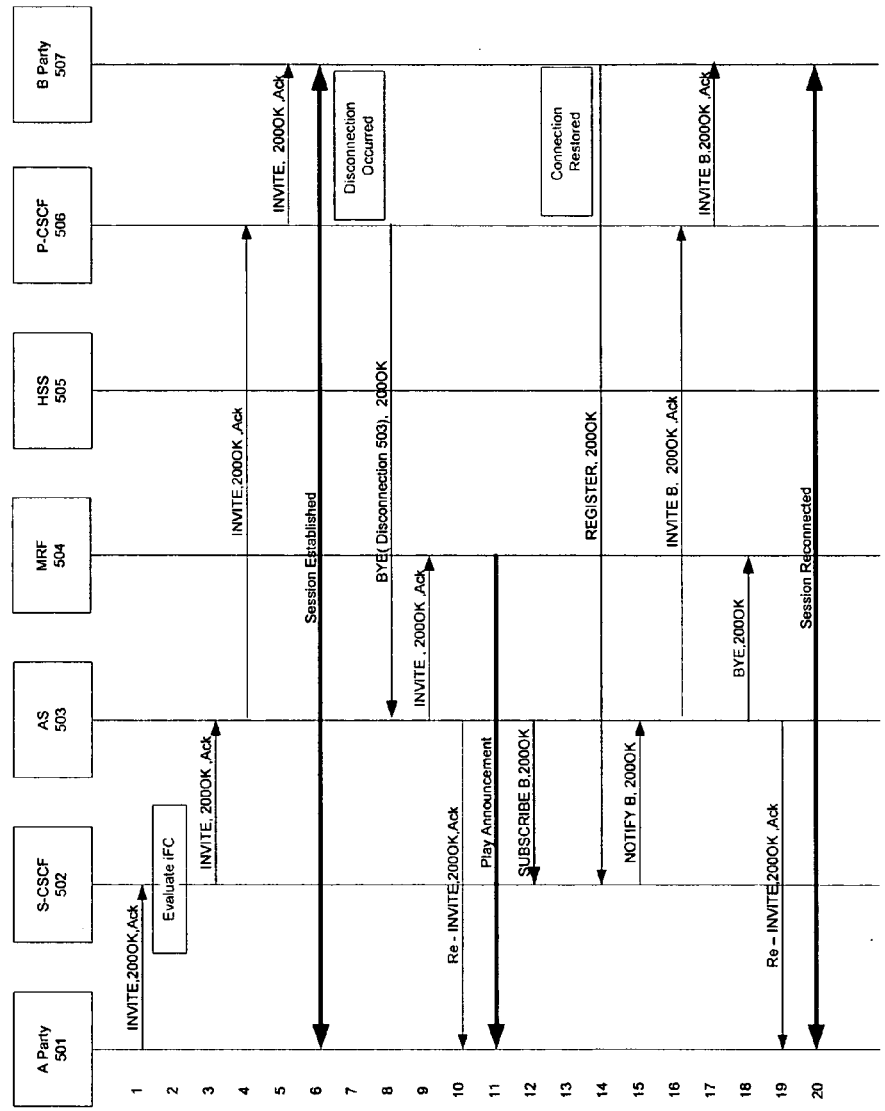
FIG. 5 is a flowchart illustrating a method for recovering an unintentionally interrupted call in an Internet Protocol Multimedia Subsystem (IMS) based telephony network based telephony network in accordance with an exemplary embodiment of the present invention.

Reference is now made to FIG. 5, which is a flowchart illustrating a method for recovering an unintentionally interrupted call in an Internet Protocol Multimedia Sub System (IMS) based Mobile telephony network in accordance with an exemplary embodiment of the present invention. The method shown in FIG. 5 is based on an Application Server (AS) 503 implementing system 1000. The Application Server (AS) 503 applies a Back to Back User Agent (B2B UA) functionality, as known in the art.

In the exemplary method shown in FIG. 5, both parties of the call are provisioned in the Home Subscriber Server (HSS) 505 to a call recovery service. Upon registration, the S-CSCF retrieves the adequate initial Filter Criteria (iFC) of each party (not illustrated) from the HSS 505 for user profile and services, using a diameter protocol, as known in the art. When a first party 501 initiates 1 a Session Initiation Protocol (SIP) session based call with a second party 507, the session is routed via a Serving Call Session Control Function (S-CSCF) 502. The iFCs indicate that Party A and Party B are provisioned to the call recovery service, explicitly indicating Application Server (AS) 503.

Upon the initiation of the session, the S-CSCF 502 evaluates the iFCs previously retrieved from the HSS 505 for user profile and services for both parties 501,507. Note that S-CSCF illustrated in FIG. 5 serves both originating and terminating Call. Hence iFCs are evaluated upon its internal Call state machine. In case of separated Serving CSCF, Originating and Terminating, the iFC of each party will be retrieved by its S-CSCF.

The HSS 505 sends the query results to the S-CSCF 502. The results inform the S-CSCF 502 that at least on of the parties is registered to the call recovery service, thus indicating 3 that the S-CSCF 502 has to route the call via the Application Server (AS) 503. Consequently, the S-CSCF 502 routes 4 the session via the AS 503, to the Proxy Call Session Control Function (P-CSCF) 506.

The P-SCSF 506 communicates 5 with the second party 507 over the GPRS infrastructure, and a call session is established 6 between the two parties 501,507. When interferences (or another network problem) occur 7 between the second party 507 and its serving switch, the second user 507 is disconnected.

The P-CSCF 506 identifies 8 the disconnection and issues an SIP BYE transaction towards the Application Server (AS) 503. The SIP BYE transaction header has a release code indicating that there occurred a malfunction in the network (e.g. interferences), for releasing the session. Next, the Application Server (AS) 503 creates 9 a new session to a Media Resource Function (MRF) 504, and invites 10 the first party to the MRF 504.

The MRF 504 plays 11 the first party 501 an announcement informing that there occurs a temporary interruption in the call connection and asking the second party 507 to hold the line while the connection is reestablished. Next, the AS 503 subscribes 12 to the Serving Call Session Control Function (S-CSCF) 502, to be notified upon the re-availability of the second party 507.

As the second party 507 becomes available 13 again (i.e. when the interference or other system malfunction ends), the second party 507 registers 14 in the S-CSCF 502. Next, the S-CSCF 502 notifies 15 the Application Server (AS) 503 that the second party 507 is available, and the AS 503 invites 16 the second party 507 to a session via the P-CSCF 506.

As the P-CSCF 506 invites the second party 507, the Application Server (AS) 503 disconnects the Media Resource Function (MRF) 504. The AS 503 invites the first party 501 (again) and the second party 507. Consequently, the two parties 501,507 are reconnected 20 in the call.

Reference Standards

References standards for IMS and IN network may include, but are not limited to: IMS standards such as RFC 3326—The Reason Header Field for the Session Initiation Protocol (SIP), the 3rd Generation Partnership Project (3GPP) TS 24.229 (Paragraph 5.2.8.1—P-CSCF initiated call release) standards, ITU Q.850—Cause Code Information, etc.

Subsequent to the disclosure of embodiments of the present invention, i is expected that many relevant devices and systems will be developed and the scope of the terms herein, particularly of the terms "IMS", "MSC", "AS", "HLR", "VLR", "HSS", "P-CSCF", "P-CSCF", and "IN", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Implementation of the methods and systems of embodiments of the present invention involves performing or completing certain selected tasks or steps manually, automatically, or a combination thereof. Moreover, according to actual instrumentation and equipment of exemplary embodiments of the methods and systems of the present invention, several selected steps could be implemented by hardware or by software on any operating system of any firmware or a combination thereof. For example, as hardware, selected steps of the invention could be implemented as a chip or a circuit.

As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the appended claims.

What is claimed is:

1. A system for recovering an unintentionally interrupted call in a telephony network, the system comprising:
   a network component that comprises a capturing portion that captures an unintentional call disconnection event between a first participant and a second participant in the telephony network; and
   a re-connector portion that establishes a temporary connection to hold the first participant in the network, while an attempt is made to reconnect the second participant to the call.

2. The system of claim 1, wherein said re-connector portion keeps said first participant of the call connected while reconnecting said unintentionally disconnected second participant, and connects said disconnected second participant and said-first participant to recover the unintentionally interrupted call.

3. The system of claim 1, wherein said re-connector portion temporarily diverts said first participant via said temporary connection to a media server until successfully reconnecting said unintentionally disconnected second participant.

4. The system of claim 1, wherein said re-connector portion disconnects said first participant upon failing to reconnect said unintentionally disconnected second participant within a predefined period of time.

5. The system of claim 4, wherein the predefined period of time is determined by a subscriber to the telephony network.

6. The system of claim 1, wherein said re-connector portion verifies that said first participant is reconnected, and wherein the verification is accomplished by at least one of using a call establishment retry, polling to a Home Location Register (HLR), polling to a Visitor Location Register (VLR), and registering to an event of a Network Serving Entity.

7. The system of claim 1, wherein said capturing portion captures data pertaining to an interruption resultant upon disconnection of a second participant of the call therefrom to determine that said disconnection is unintended by said first participant.

8. The system of claim 1, wherein said capturing portion captures said data pertaining to said interruption of the call according to a predefined capturing policy.

9. The system of claim 1, wherein the telephony network is selected from the group consisting of a mobile phone telephony network, an Intelligent Network (IN) based telephony network, and an Internet Protocol Multimedia Subsystem (IMS) based telephony network.

10. A method for recovering an unintentionally interrupted call in a telephony network, comprising: a) capturing data pertaining to an interruption of the call between a first participant and a second participant from the telephony network and; b) keeping the first participant connected while an attempt is made to reconnect to the second participant; and c) automatically reconnecting the first participant to the second participant of the call, thereby recovering the unintentionally interrupted call.

11. The method of claim 10, further comprising: temporarily diverting said first participant to a media server until successfully reconnecting said unintentionally disconnected participant.

12. The method of claim 10, further comprising: disconnecting said first participant upon failing to reconnect said unintentionally disconnected participant within a predefined period of time.

13. The method of claim 12, wherein the predefined period of time is set by a subscriber of the telephony network.

14. The method of claim 10, further comprising: verifying that said second participant is reconnected, wherein the verification is accomplished using at least one selected from the group consisting of using a call establishment retry, polling to a Home Location Register (HLR), polling to a Visitor Location Register (VLR), and registering to an event of a Network Serving Entity.

15. The method of claim 10, further comprising: before the reconnecting, determining that said disconnection is unintended by said unintentionally disconnected second participant.

16. The method of claim 10, further comprising: defining a capturing policy, wherein said capturing data pertaining to said interruption of the call is carried out according to said capturing policy.

17. The method of claim 10, wherein the telephony network is selected from the group consisting of a mobile telephony network, an Intelligent Network (IN) based telephony network, and an Internet Protocol Multimedia Subsystem (IMS) based telephony network.

18. The method of claim 10, further comprising playing a predetermined message to the first participant of the call connected while reconnecting said unintentionally disconnected second participant.

19. The method of claim 12, wherein the predefined period of time is set by an administrator of the telephony network.

* * * * *